United States Patent [19]
Backich et al.

[11] Patent Number: 5,716,087
[45] Date of Patent: Feb. 10, 1998

[54] ERGONOMIC SCOOP ASSEMBLY

[75] Inventors: Daniel A. Backich, Churchville, Pa.;
Kevin J. Costello, Oyster Bay, N.Y.

[73] Assignee: McNeil-PPC, Inc., Skillman, N.J.

[21] Appl. No.: 678,616

[22] Filed: Jul. 10, 1996

[51] Int. Cl.⁶ .................................................. B25G 1/10
[52] U.S. Cl. .............................. 294/55; 294/25; 16/114 R
[58] Field of Search ..................... 294/1.3–1.5, 19.1,
294/25, 26, 55, 57, 58; 16/110 R, 113,
114 R, 115; 30/298

[56] References Cited

U.S. PATENT DOCUMENTS

| | | | |
|---|---|---|---|
| D. 267,536 | 1/1983 | Findlay | D7/318 |
| 309,437 | 12/1884 | Calef . | |
| D. 328,809 | 8/1992 | Shooter | D32/74 |
| 607,154 | 7/1898 | Berck . | |
| 907,345 | 12/1908 | Halfmann | 30/298 |
| 1,098,070 | 5/1914 | Whitney . | |
| 1,642,985 | 9/1927 | Beebe | 294/55 |
| 2,299,418 | 10/1942 | Thomas | 294/55 |
| 2,710,571 | 6/1955 | Pfister | 97/61 |
| 4,136,900 | 1/1979 | Thompson | 294/1.5 |
| 4,822,087 | 4/1989 | DeCarlo | 294/1.1 |
| 4,888,846 | 12/1989 | Natale | 15/236.01 |
| 4,924,924 | 5/1990 | Stewart | 142/49 |
| 4,941,261 | 7/1990 | Glenn | 30/296.1 |
| 4,950,013 | 8/1990 | Yonkers | 294/55 |
| 5,025,560 | 6/1991 | Townsend | 30/298 |
| 5,031,323 | 7/1991 | Honsa et al. | 30/276 |
| 5,125,130 | 6/1992 | Stanish | 16/110 R |
| 5,156,429 | 10/1992 | Adams | 294/55 |
| 5,228,610 | 7/1993 | Spence | 224/267 |
| 5,275,068 | 1/1994 | Wrench | 74/557 |
| 5,368,465 | 11/1994 | Wanderer | 425/187 |
| 5,379,758 | 1/1995 | Snyder | 128/20 |

FOREIGN PATENT DOCUMENTS

| | | |
|---|---|---|
| 23 64 957 | 7/1975 | Germany . |
| 2248034 | 3/1992 | United Kingdom ..... 16/113 |

OTHER PUBLICATIONS

Product literature for "ERGOSCOOP", Process Solutions, Riviera Beach, FL, p. 5 C–20 & C–21, no date.

*Primary Examiner*—Dean Kramer

[57] ABSTRACT

An ergonomic scoop assembly including a scoop subassembly and scoop support subassembly. The scoop assembly is preferably detachably connectable to the scoop support subassembly. The scoop support subassembly includes a saddle member for contacting the ventral side of a user's forearm and structure for releasably securing the scoop support subassembly to the user's forearm. The scoop support subassembly further includes a rear portion to which the saddle member is attached and a fore portion attached to a handle of the scoop subassembly. When the scoop support subassembly is attached to the user's forearm the handle of the scoop subassembly defines an angle with respect to the longitudinal axis for the user's forearm of between about 115° to about 125°. The scoop assembly enables the user to comfortably and effectively perform scooping operations for prolonged periods of time with minimal fatigue and at considerably reduced potential for cumulative trauma injury to the user's upper extremities versus conventional scoop designs.

14 Claims, 7 Drawing Sheets

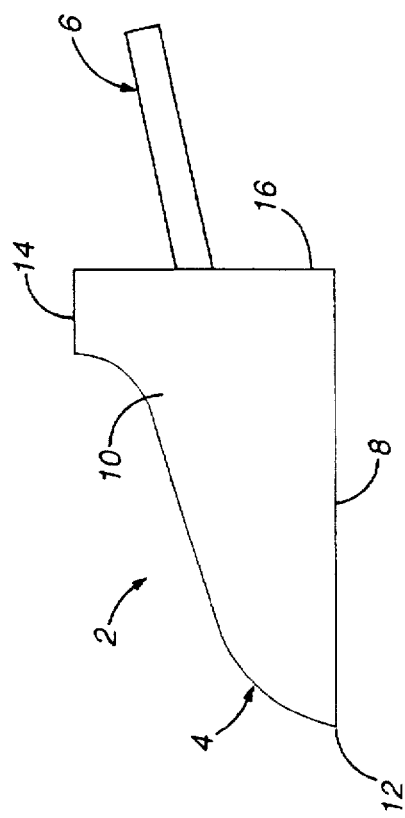
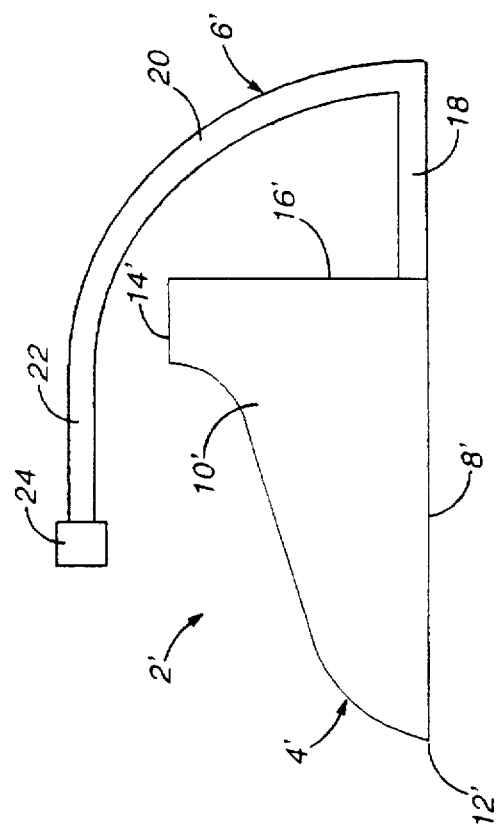
FIG. 1 (Prior Art)
FIG. 2 (Prior Art)

ERGONOMIC SCOOP ASSEMBLY

FIELD OF THE INVENTION

The present invention relates in general to hand held and operated tools and, more particularly, to an ergonomic scoop assembly for reducing stress related fatigue, strain and injury to the upper extremities, particularly the hand, wrist, forearm and elbow.

BACKGROUND OF THE INVENTION

Cumulative trauma injuries to the upper extremities and other areas of the body are by nature the result of prolonged and repetitive exposure to damaging stress. While generally effective for performing their designated tasks, many hand held and operated implements such as garden tools, construction tools, manufacturing tools, food preparation devices and the like frequently cause fatigue, strain and injury to a user's upper extremities, especially when deployed for extended periods of time. Accordingly, improvements have been proposed to the basic designs of many of these implements to more naturally orient the user's extremities and/or distribute the forces associated with carrying out a particular motion. The modified devices are generally task-specific and, to a greater or lesser extent, reduce stress related trauma attendant to prolonged use of a particular hand tool.

Of these, some merely address force distribution, primarily force imposed on the tool being redistributed to the user's forearm. Examples include the apparatus disclosed in U.S. Pat. Nos. 1,098,070, 2,710,571, 4,822,087, 4,941,261, 5,031,323, 5,228,610, 5,368,465 and 5,379,758.

Others merely address repositioning of a user's extremities into a more ergonomically correct orientation. An example of this approach may be found in U.S. Pat. No. 5,125,130.

Still others combine the notions of force distribution with ergonomic handle design. Examples include the devices disclosed in U.S. Pat. Nos. 4,888,846, 4,924,924, 5,025,560, 5,156,429 and 5,275,068. Among these, U.S. Pat. Nos. 4,888,846, 4,924,924, 5,025,560 and 5,275,058 disclose apparatus which are designed to relieve cumulative stress specifically associated with reciprocating or "push-pull" motions and rotational type motions encountered in the use of knives, scrapers and hand held lathe tools. These disclosures do not address ergonomic problems associated with hand tools that undergo motions other than reciprocation and/or rotation.

In contrast, U.S. Pat. No. 5,156,429 describes a seemingly "all-purpose" utility handle that includes an inclined handgrip member and a portion for redistributing forces to an operator's forearm. The utility handle is described as being capable of enabling a user to maneuver an article in any combination of lowering, turning and/or reciprocating motions with reduced fatigue. The handgrip member may be disposed at some fixed angle of between about 100° and 140° relative to a horizontal member which engages an article to be maneuvered, which horizontal member is substantially parallel to the longitudinal axis of the forearm of a user when the utility handle is in use.

Because each object that may be maneuvered by the utility handle disclosed in U.S. Pat. No. 5,156,429 possesses a unique set of maneuverability requirements (disclosed examples include widely disparative items such as leashed animals, fish, electric drills and reciprocating saws), an inclined gripping member whose angle of inclination may be especially suited to manipulating leashed animals, for example, may be entirely unsuitable for manipulating an electric drill. In other words, the motions associated with manipulation of each species of hand held object or tool are highly task specific. Accordingly, optimum performance is achieved when, for a particular implement, the implement's handle is disposed at a specific angle or within a limited angular range that most effectively promotes proper manipulation of the implement. Consequently, depending on the specific angle of inclination chosen for its handgrip member, the utility handle disclosed in U.S. Pat. No. 5,156,429 may provide find considerable benefit when used to manipulate one type of implement but quite limited advantage when used to manipulate another.

In this regard, the longitudinal axis of the human forearm and the grip axis of the human hand, when the wrist is in a neutral position with respect to the forearm, define an angle of between about 105° about 115°. Further, maximum ulnar deviation, i.e., pivoting of the wrist and hand toward the fifth finger (a.k.a. the little finger or pinkie) is approximately 30°. Combining the normal range of ulnar deviation (0° to approximately 30°) with the natural angle defined between the longitudinal axis of the forearm and the grip axis of the hand when the wrist is in a neutral position with respect to the forearm produces a resultant angle between the grip axis and longitudinal axis of the forearm of between about 105° and 145°. It will be readily appreciated, therefore, that the approximately 100° to 140° handgrip member inclination angle disclosed in U.S. Pat. No. 5,156,429 spans essentially the entire range of ulnar deviation available to the hand and wrist with respect to the forearm. Hence, the disclosure in U.S. Pat. No. 5,156,429 asserting that the handgrip member may be oriented at an angle of between about 100° and 140° relative to horizontal (and thus the longitudinal axis of the forearm) is merely another way of stating that the handgrip member may conceivably be disposed at virtually any position available to the grip axis versus the longitudinal forearm axis in the ulnar deviation plane. However, such generalized disclosure provides little guidance as to how one might judiciously select an optimum handle angle for a specific hand tool whereby the hand tool may be manipulated for utmost performance and with minimal fatigue and/or cumulative trauma injury to a user's upper extremities.

In this connection, repetitive motions experienced by users of hand held scoops employed, for example, in the pharmaceutical industry for mixing and weighing chemicals have been identified as a cause of cumulative stress related fatigue, strain and injury to the upper extremities, particularly the hand, wrist, forearm and elbow. Industrial scoops are somewhat spade or shovel-like in design. That is, they typically comprise an elongated, upwardly open, substantially semi-cylindrical bowl having a base and contiguous opposed side walls which taper upwardly from a forward or leading edge and are connected to a substantially vertical rear wall. A short handle projects rearwardly from the rear wall, usually at a slight upward angle. The handle is grasped by an operator and is used manipulate the scoop. Scoops of this type typically have a bowl capacity of from about one-half dry pint (approximately 17 in$^3$) to about one dry gallon (approximately 270 in$^3$) and are used to manipulate loads of particulate or granular material weighing from a few ounces to several pounds.

When using industrial scoops for several hours a day, especially those scoops of greater capacity, workers frequently experience muscle and joint fatigue in their hands, wrists, forearms, elbows and other areas or their upper extremities. Prolonged usage over periods of several months or years has been known to cause sprain/strain and related cumulative trauma injuries to the upper extremities of workers who use such scoops on a daily basis.

At least one manufacturer, Process Solutions of West Palm Beach, Fla., has introduced a modified industrial scoop marketed under the trade name Ergoscoops™. This scoop has a substantially semi-cylindrical bowl constructed similar to that of more conventional scoops. It differs from other scoops, however, in that its handle is generally U-shaped whereby the handle is attached to and projects from the rear wall of the scoop bowl and curves upwardly and forwardly to define a handgrip portion extending above and substantially parallel to the bowl. The distal end of the gripping portion is also provided with an enlarged "hand stop" to prevent a worker's hand from sliding from the handgrip portion as the scoop is thrust into a mass of material that is to be scooped.

The motions associated with manipulating a hand held scoop used for scooping particulate or granular material, e.g., dry chemicals, primarily comprise forward thrusting and vertical lifting and, to a lesser extent, pronation/supination (i.e., rotation) of the forearm about its longitudinal axis. The thrusting motion is required to insert the leading edge of the scoop bowl into a mass of particulate or granular material. The lifting motion is required to raise the loaded scoop from the mass of material. And, the forearm pronation/supination motion is required to deposit material contained in the scoop at a desired location.

While the Ergoscoops™ design possesses a hand stop at the distal end of the handle member for enhancing thrustability of the scoop, the thumb, index finger and their adjoining hand tissues must come into forceful, percussive abutment with the hand stop to realize the full thrust benefit of afforded by the hand stop. If performed for extended periods, this continued compressive contact may cause bruising, abrasion and/or callusing of the affected skin areas and possibly inflammation or other damage to the thumb and index finger muscles, tendons, ligaments and bones.

Additionally, in existing industrial scoops, including the Ergoscoops™ design, there is no structure for arresting movement of a user's wrist during either the lifting or thrusting motions. As such, particularly with larger scoops carrying heavier loads, the scoop operator typically experiences involuntary ulnar deviation (pivoting of the hand and wrist toward the pinkie) and must impose a certain degree of wrist flexion (curling of the hand and must impose a certain degree of wrist inwardly toward the body) in order to thrust the scoop into and raise the scoop from a mass of particulate or granular material. Repetitive ulnar deviation and wrist flexion have been identified as direct causes of finger, hand and forearm muscle fatigue, as well as inflammation of their associated tendons and ligaments.

Moreover, no presently available scoop constructions, including Ergoscoops™, provide means for transferring lifting forces to a user's forearm to redistribute the load from the hand and wrist to the more robust and fatigue resistant structures of the forearm, elbow and upper arm muscles.

An advantage exists, therefore, for an ergonomic scoop assembly that is especially well suited to accommodate the thrusting and lifting motions associated with scooping particulate or granular material when using a hand operated scoop. Such assembly should include means for redistributing lifting forces to a user's forearm as well as a handgrip disposed at an angle which optimizes scoop performance yet is comfortable to the majority of the population expected to use the scoop. So constructed, the scoop may be used for prolonged periods with considerably reduced potential for fatigue and/or cumulative trauma injury.

SUMMARY OF THE INVENTION

The present invention provides an ergonomic scoop assembly that enables a user to comfortably maneuver a hand operated scoop for prolonged periods of time with minimal fatigue and/or cumulative trauma harm to the user's upper extremities, particularly the hand, wrist, forearm and elbow.

The scoop assembly comprises cooperating scoop and scoop support subassemblies which together function to alleviate the physiological consequences of the forward thrusting and vertical lifting motions associated with a hand operated scoop during a scooping procedure. The scoop subassembly comprises a rigid scoop having a bowl portion of generally conventional construction and a handgrip portion rearwardly and downwardly projecting from a rear wall of the bowl portion.

The scoop support subassembly comprises a rigid frame member having an elongate rear portion, a transition portion and a fore portion. The rear portion preferably adjustably supports a saddle member for contracting the posterior or ventral side of a user's forearm. The fore portion includes attachment means for connecting the frame member to the handgrip portion of the scoop subassembly to the scoop support subassembly. And, the transition portion joins the rear portion to the fore portion in such a way that the handgrip portion of the scoop assembly defines a predetermined angle with respect to the longitudinal axis of the forearm of the user. The predetermined angle is specifically selected to afford the user considerable mechanical advantage and retain the user's hand in a comfortable and natural disposition throughout a scooping operation, including both the thrusting and lifting motions thereof.

The saddle member also includes means, such as adjustable straps, for releasably attaching the saddle member to a user's forearm. Accordingly, when the scoop support subassembly is attached to the user's forearm and the scoop assembly is attached to the scoop support subassembly, the scoop assembly of the present invention simultaneously offers the benefits of an effective thrusting and lifting apparatus which enables the user to perform scooping for lengthy periods of time with minimal fatigue or other harm to his upper extremities.

BRIEF DESCRIPTION OF THE DRAWINGS

FIG. 1 is a side elevation view of a conventional hand held and operated scoop;

FIG. 2 is a side elevation view of another conventional hand held and operated scoop;

DETAILED DESCRIPTION OF THE INVENTION

Figure 3:
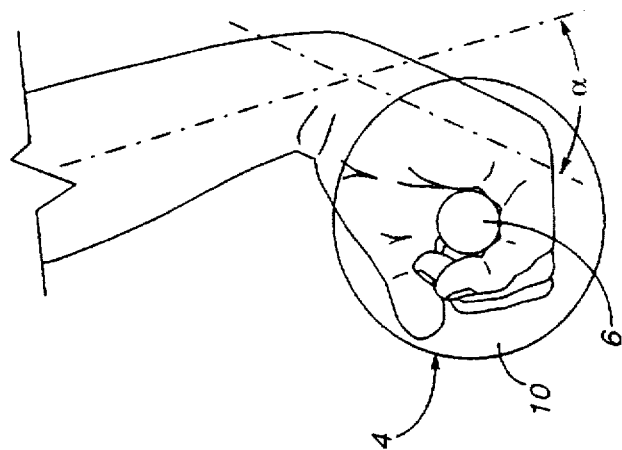
FIG. 3 is a rear elevation view of the scoop of FIG. 1 demonstrating the wrist flexion exerted by a user when manipulating the scoop.

Referring to FIG. 1, there is shown a scoop 2 of conventional construction which may be used to scoop particulate or granular material. Scoop 2 typically comprises a bowl 4 and a handle 6. The bowl 4 is usually configured as an elongated, upwardly open, substantially cylindrical rigid member formed from metal, plastic or other suitable rigid material. Bowl 4 includes a base 8 and contiguous opposed side walls 10 (only one of which is shown) which taper upwardly from a forward or leading edge 12 and meet at a crown 14. The rear edges of base 8 side walls 10 and crown 12 are connected to a substantially vertical rear wall 16. Handle 6, which typically ranges from about four to eight inches in length, is also fabricated rigid material and is normally fixedly attached to the rear wall 16 of bowl 4 so as to project rearwardly therefrom, usually at a slight upward angle (as illustrated).

Scoops such as scoop 2 typically have a bowl capacity of from about one-half dry pint (approximately 17 in$^3$) to about one dry gallon (approximately 270 in$^3$) and are used to manipulate loads of particulate or granular material weighing from a few ounces to several pounds.

Figure 4:
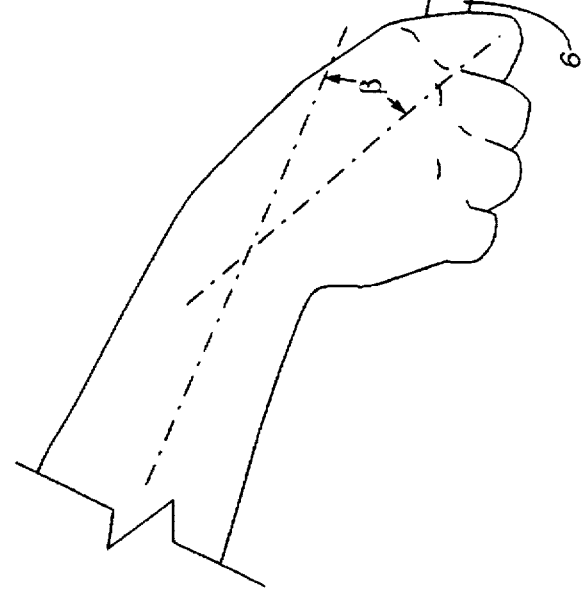
FIG. 4 is a side elevation view of the scoop of FIG. 1 demonstrating the ulnar deviation a user experiences when manipulating the scoop.

To operate scoop 2 an operator grasps the handle 6 with his thumb and forefinger closest the rear wall 10 of bowl 4 in the manner shown in FIGS. 3 and 4. Referring initially to FIG. 3, it will be seen that, in order to grasp handle 6 and generate the leverage necessary to thrust the scoop 2 into a mass of granular or particulate material and raise the loaded scoop from such material, the user must rotate or curl the hand and wrist inwardly toward the body. This motion, commonly referred to as "wrist flexion," has been observed to define an angle α between the longitudinal axis of the user's forearm and the closed hand ranging from about 35° to about 45° for most users performing ordinary scooping tasks. Maximum available wrist flexion is approximately 70° in most persons.

FIG. 4 reveals that, in addition to wrist flexion, the user also experiences ulnar deviation, i.e., pivoting of the hand and wrist toward the pinkie, when scooping, particularly during lifting of scoop 2. The angle at which the hand and wrist ulnarly deviate with respect to the longitudinal axis of the forearm is designated by reference character β in FIG. 4. Angle β is typically about 25° for most scooping operations. This angle is quite near to the maximum ulnar deviation of approximately 30° available to most persons.

When using a scoop constructed like scoop 2 for several hours a day, especially those scoops of greater capacity, workers continually are subjected to moderate, yet substantial, wrist flexion and considerable ulnar deviation. Consequently, they frequently experience muscle and joint fatigue in their hands, wrists, elbows and other areas of their upper extremities. Moreover, prolonged usage over several months or years has been known to cause sprain/strain and related cumulative trauma injuries to the upper extremities of workers who use such scoops on a daily basis.

Turning to FIG. 2, wherein like reference characters bearing prime (') symbols designate like or corresponding parts to those of scoop 2 illustrated in FIGS. 1, 3 and 4, there is generally shown another commercially available scoop which is identified herein by reference numeral 2'. Scoop 2' depicts the general construction of the Ergoscoops™ scoop manufactured by Process Solutions of West Palm Beach, Florida. Scoop 2' comprises a bowl 4' and a handle 6'. Bowl 4' includes a base 8', a leading edge 12', side walls 10' crown 14' and rear wall 16' and may be fabricated from essentially the same materials and assume essentially the same shapes and dimensions as bowl 4 of scoop 2. Scoop 2' thus is distinguished from scoop 2 primarily by the configuration of its handle 6'.

Handle 6' comprises a first portion 18 affixed to and extending rearwardly from the rear wall 12' of bowl 4' and a second portion 20 extending upwardly and forwardly from the first portion 18 to define a handgrip portion 22 residing above and substantially parallel to the bowl 4' The distal end of the handgrip portion 22 is provided with an enlarged hand stop 24 to prevent a worker's hand from sliding from the handgrip portion 22 as the scoop 2' is thrust into a mass of material to be manipulated. While the hand stop 24 enhances thrustability of the scoop 21, the thumb, index finger and their adjoining hand tissues must come into forceful, percussive abutment with the hand stop 24 to realize the full benefit of thrust enhancement afforded by the hand stop. If performed for extended periods, this continued compressive contact may cause bruising, abrasion and/or callusing of the affected skin areas and possibly inflammation or other damage to the affected thumb and index finger muscles, tendons, ligament and bones.

Additionally, in existing industrial scoops, including scoop 2', there is no structure for arresting movement of a user's wrist during either lifting or thrusting motions. As such, particularly with larger scoops carrying heavier loads, the scoop operator typically experiences involuntary ulnar deviation (pivoting of the hand and must impose a certain degree of wrist toward the pinkie, FIG. 4) and wrist flexion (curling of the hand and wrist inwardly toward the body, FIG. 3) in order to thrust the scoop into and raise the scoop from a mass of particulate or granular material. Repetitive ulnar deviation and wrist flexion have been identified as direct causes of finger, hand and forearm muscle fatigue, as well as inflammation of their associated tendons and ligaments.

Moreover, neither scoop 2 nor scoop 2' provide means for transferring lifting forces to a user's forearm to redistribute the load from the hand and wrist to the more robust and fatigue resistant structures of the forearm, elbow and upper arm muscles.

Figure 5:
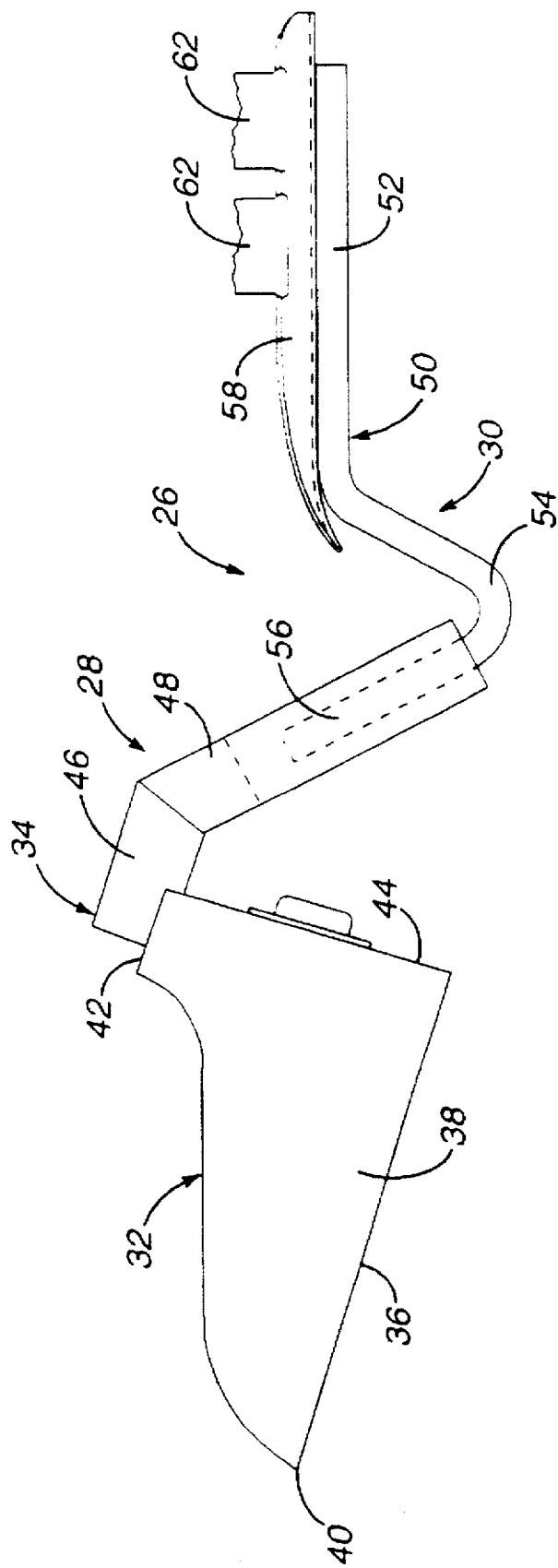
FIG. 5 is a side elevation view of a presently preferred embodiment of a scoop assembly constructed in accordance with the present invention.
Figure 6:
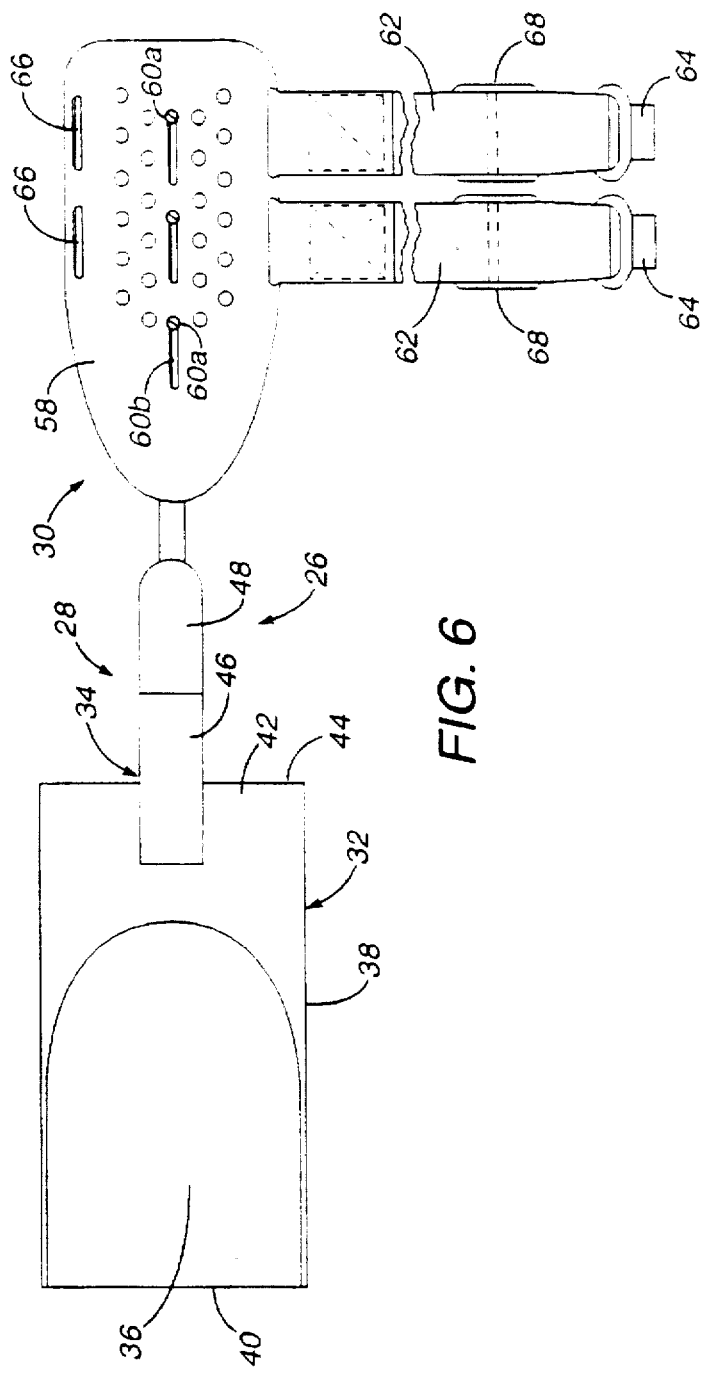
FIG. 6 is a top plan view of the scoop assembly of FIG. 5.
Figure 7:
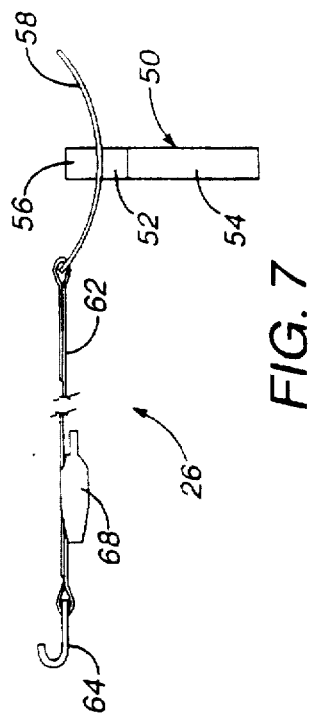
FIG. 7 is a rear end elevation view of the scoop assembly of FIG. 6 with the scoop subassembly thereof omitted for clarity of illustration.

FIGS. 5, 6 and 7 illustrate a presently preferred embodiment of a scoop assembly 26 according to the present invention, which scoop assembly incorporates multiple and mutually cooperating features which serve to reduce fatigue and cumulative trauma uniquely associated with a scooping operation. Scoop assembly 26 comprises a scoop subassembly 28 and a scoop support subassembly 30.

Figure 9:
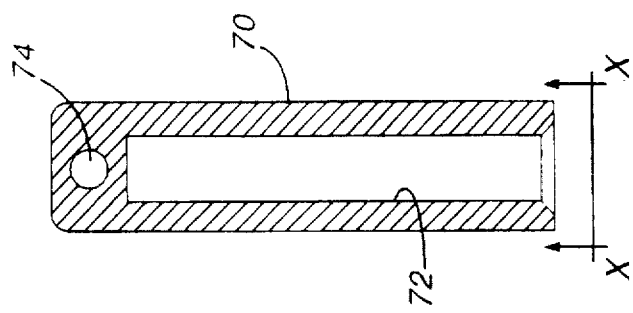
FIG. 9 is an elevational cross-section view of a handgrip insert member for use in the scoop subassembly of FIG. 8.
Figure 8:
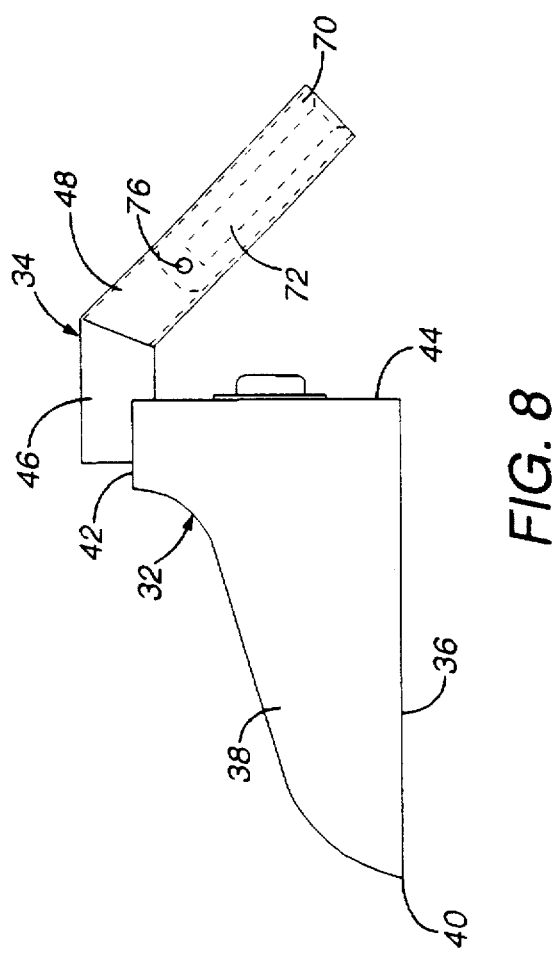
FIG. 8 is a side elevation view of a presently preferred embodiment of a scoop subassembly constructed in accordance with the present invention.
Figure 10:
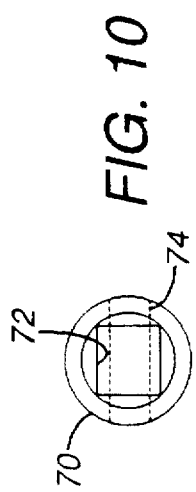
FIG. 10 is an end view of the handgrip insert member of FIG. 9 as seen from line X—X of that figure.

Scoop subassembly 28, which is described in greater detail herein in connection with the discussion of FIGS. 8, 9 and 10, comprises a rigid scoop including a bowl portion 32 and a handle portion 34. Bowl portion 32 is generally constructed as an elongated, upwardly open, substantially semi-cylindrical member having a base 36 and contiguous opposed side walls 38 which taper upwardly from a forward or leading edge 40 and meet at a crown 42. The rear edges of base 36, sidewalls 38 and crown 42 are connected to a substantially vertical rear wall 44. However, the actual construction of the bowl portion 32 is not critical to the present invention. Indeed, the bowl portion 32 may be fabricated from essentially the same materials and assume essentially shapes and dimensions as bowls 4, 4' of scoops 2,2' of FIGS. 1 and 2 or other suitable configurations.

Handle portion 34 preferably comprises a first section 46 fixedly connected such as by welding, mechanical fasteners or the like to crown 42. Handle portion further preferably comprises a second section 48 downwardly and rearwardly disposed at an angle of between about 30° to 60°, more preferably about 45°, with respect to first section 46. Second section 48 is desirably about five to six inches in length to accommodate the hands of virtually any user. Moreover, second section 48 should have circumferential wall dimensions to permit comfortable grasping thereof by the anticipated user population. In this regard, second section 48 may be formed of rigid metal or plastic tubing of between about 1 and 1½ inches, more preferably about 1¼ inches, in diameter.

Further, if desired or necessary, the exterior of the second section 48 may also be covered with grip enhancing materials such as tapes, foam rubber or the like.

In an alternative but unillustrated construction, it is also contemplated that the first section 46 of handle portion 34 may be omitted. In that event, the handle portion 34 would be formed as a single section dimensionally and angularly corresponding to second handle section 48 and fastened directly to the rear wall 44 of bowl portion 32 so as to extend downwardly rearwardly therefrom.

Additional details of the scoop assembly 28 will be described hereinafter in connection with the discussion of FIGS. 8, 9 and 10.

Figure 12:
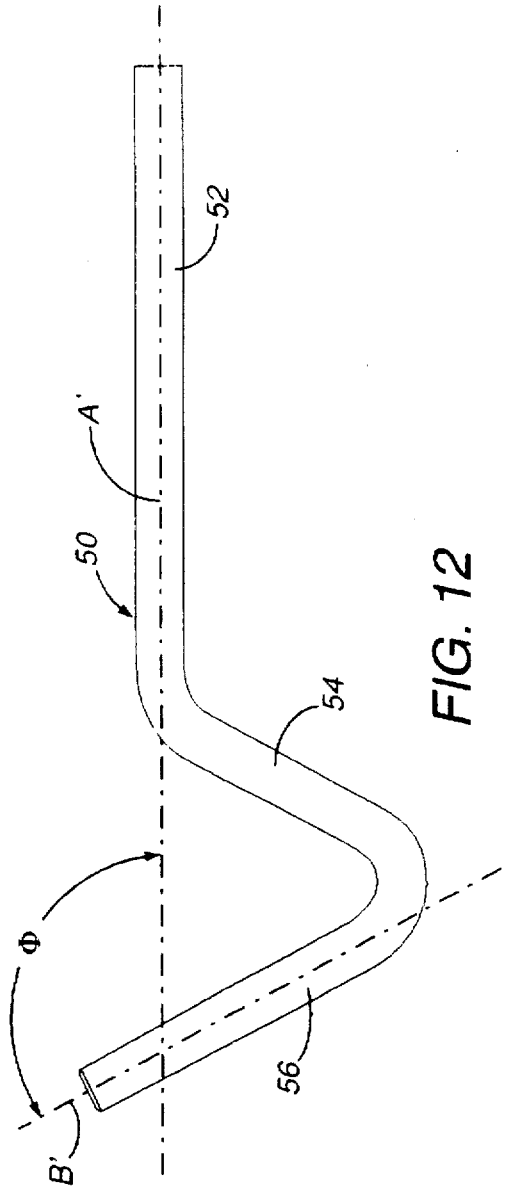
FIG. 12 is a side elevation view of a rigid frame member for use in a presently preferred embodiment of a scoop support subassembly constructed in accordance with the present invention.

Still referring to FIGS. 5, 6 and 7, it is seen that the scoop support subassembly 30 preferably comprises a rigid frame member 50, the specifics of which will be more fully appreciated upon consideration of the description of FIG. 12. Generally, however, rigid frame member 50 is preferably fabricated as a unitary member of lightweight, yet high strength material such as metal or plastic bar stock which defines an elongate rear portion 52, a transition portion 54 and a fore portion 56.

The rear portion 52 preferably adjustably supports a saddle member 58 for contacting the posterior or ventral side of a user's forearm. Saddle member 58 is preferably fabricated from lightweight, high strength metal or plastic plate which is formed into a generally concave shape as is perhaps most clearly depicted in FIG. 7. The saddle member 58 is preferably adjustably connected to the rigid frame member 50. Any suitable means, such as, for example, set screws 60a threadably received in rigid frame member 50 and cooperating slots 60b provided in saddle member 58, may be used to adjust the saddle member 58 with respect to the rear portion 52 of rigid frame member 50. The range of adjustability should be such that the saddle member 58 can accommodate the hand and forearm sizes ranging from the 5th percentile woman (very short forearm and very small hand) through the 95th percentile man (very long forearm and very large hand) to thereby reasonably accommodate virtually all of the anticipated working population. In addition, although not illustrated, the upper surface of the saddle member may be provided with a padded liner such as a low tack foam rubber cushion or the like that may be permanently or detachably connected to the saddle member to minimize contact stresses to the bones and tendons of the forearm. Alternatively, or in addition to a padded liner, the operator may wear a padded forearm sleeve to reduce forearm contact stresses.

The saddle member 58 also preferably includes means for releasably attaching the saddle member, and thus the scoop support subassembly 30, to a user's forearm. Such means preferably comprise at least one or, more preferably, two straps 62 having first ends fixedly attached along one edge of the saddle member 58 and second ends carrying fastening means such as hooks 64 or the like for releasably engaging slots 66 or other suitable engagement structure provide along an opposite edge of the saddle member 58. The straps 62 may be fabricated from rugged fabric such as, for example, elastic or inelastic nylon, polyester, cotton, or the like, or blends of such materials. To adjust the tension of straps 62 and to accommodate the various circumferences of forearms that may use the scoop assembly 26, each of the straps further preferably include an adjustment means such as a sliding buckle 68 or the like.

The transition portion 54 of rigid frame member 50 essentially comprises a region of member 50 for connecting the rear portion 52 to fore portion 56 to effectively achieve the objects of the present invention. As presently contemplated, the transition portion is constructed as a region of member 50 extending forwardly and downwardly from the front end of the elongate rear portion 52. The end of transition portion 54 opposite rear portion 52 is joined to the lower end of the fore portion 56. Fore portion 56, as will be discussed in greater detail hereinafter with respect to FIG. 12, extends upwardly and forwardly from transition portion 54 at a predetermined angle selected to maximize user comfort (and scoop performance) and minimize user fatigue when the scoop subassembly 28 is joined to the scoop support subassembly 30 and the user is performing the forward thrusting and vertical lifting motions of a scooping operation.

As will be more fully appreciated from FIGS. 8, 9 and 10, the fore portion 56 of rigid frame member 50 and the handle portion 34 of the scoop subassembly 30 define cooperating means for connecting, preferably in adjustable fashion, the scoop assembly 28 and the scoop support subassembly 30 to establish the combined scoop assembly 26 of the present invention.

Turning to FIGS. 8, 9 and 10, there is shown an insert member 70 dimensioned to be closely received in the second section 48 of handle portion 34 of scoop subassembly 28. Insert member 70 is preferably about 4 inches in length and fabricated from rigid material such as plastic or the like that can be formed to define a socket 72 dimensioned to matingly receive the fore portion 56 of rigid frame member 50. The insert member 70 may be retained in the second handle member by any suitable anchoring means. According to a presently preferred embodiment the insert member 70 and second handle section 48 include aligned bores 74 (FIGS. 9 and 10) and 76 (FIG. 8), respectively, through which may be inserted a suitable anchoring pin or the like (not illustrated). To further assure anchorage of insert member 70 within second handle section 48, the exterior surface of the insert member may be coated with a high bond strength and durable adhesive such as epoxy or the like prior to insertion of the insert member into the second handle section.

The socket 72 provided in insert member 70 is selected to match the circumferential shape of the fore portion 56 of the rigid frame member 50 such that the scoop subassembly 28 is held in non-rotatable relation with respect to the scoop support subassembly 30. According to a presently preferred embodiment, the rigid frame member 50 (FIG. 12), including fore portion 56 thereof, is constructed so as to have a substantially square cross-sectional configuration. As such, socket 72 of insert member 70 also is desirably formed so as to be square in cross-section and dimensioned to closely and slidingly receive the fore portion 56 of rigid frame member 50. Although not illustrated, the second handle section 48 and/or the rigid frame member fore portion 56 may include means for adjusting the position of the second handle section 48 relative to the rigid frame member fore portion 56. An example of suitable adjustment means for this purpose may comprise one or more set screws or the like passing through the second handle portion 48 and insert member 70 for compressively contacting one or more surfaces of rigid frame member fore portion 56.

Figure 11:
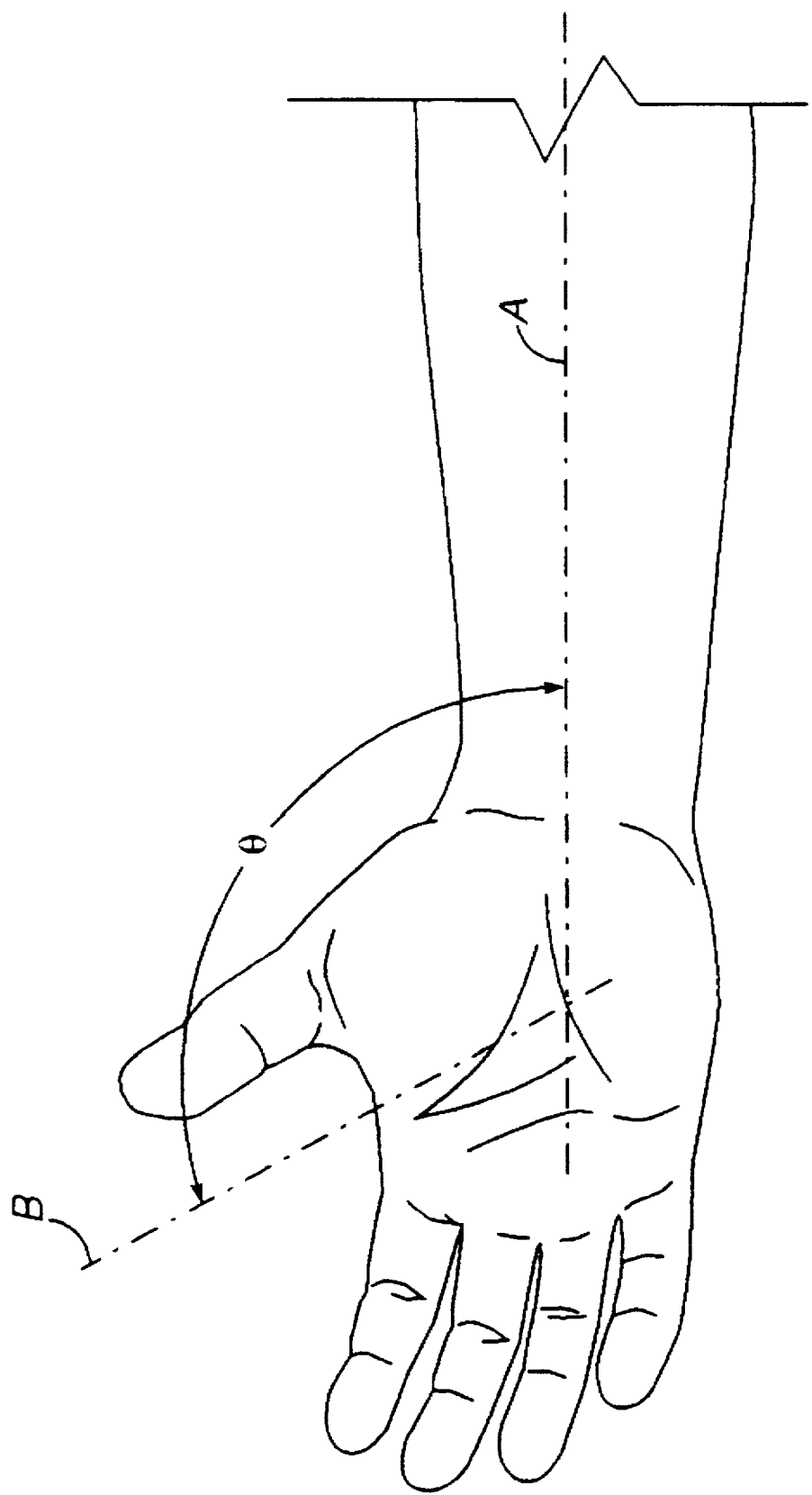
FIG. 11 is a side elevation view of a user's forearm, wrist and hand illustrating the relative dispositions of the longitudinal axis of the forearm and the grip axis of the hand when the hand and wrist are in a relaxed, neutral position with respect to the forearm.

FIG. 11 shows the relative dispositions of the longitudinal axis A the forearm and the grip axis B of the hand when the hand and wrist are in a relaxed, neutral position with respect to the forearm. When so disposed, the longitudinal axis A of the forearm and the grip axis B define an angle θ of between about 105° to about 115° depending primarily upon the musculoskeletal peculiarities unique to each individual's hand. The significance of angle θ in the context of the present invention will be more fully appreciated with reference to FIG. 12.

Figure 13:
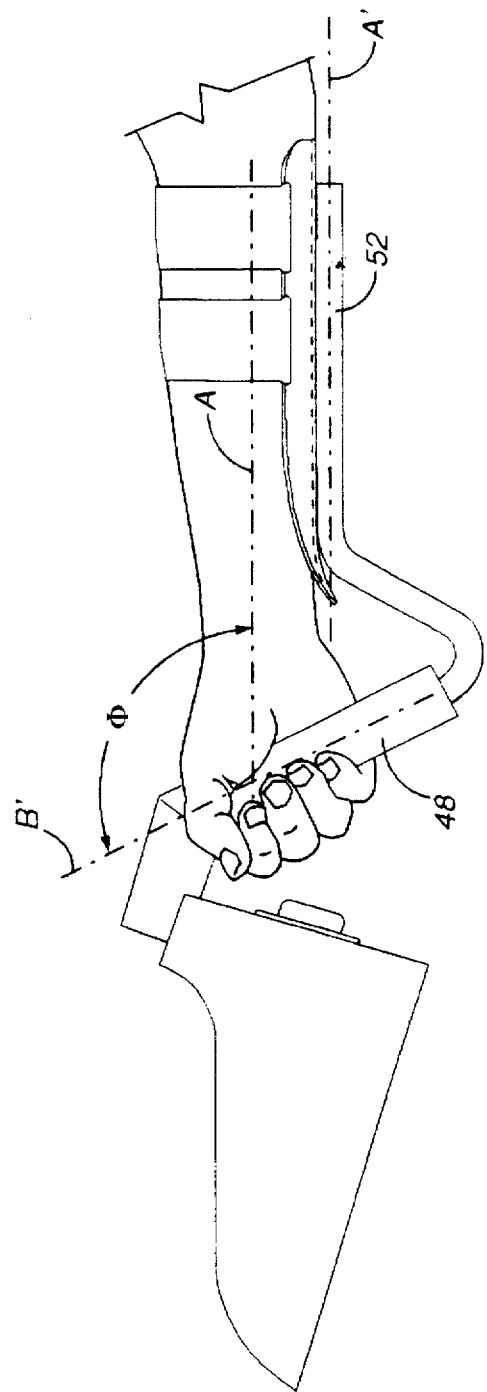
FIG. 13 is a side elevation view of the scoop assembly of the present invention attached to the forearm of a user.

FIG. 12 depicts on an enlarged scale a presently preferred construction of rigid frame member 50. As previously mentioned, rigid frame member 50 is preferably fabricated is a unitary piece of lightweight and high strength rigid material. A material suitable for present purposes is ½ inch square aluminum bar stock. Rear portion 52 is desirably between about 6 to about 8 inches in length, transition portion 54 between about 4 to about 6 inches in length. Rear portion 52 has a longitudinal axis A' which is substantially parallel to the longitudinal axis A of a user when the scoop assembly 26 is fastened to user's forearm as shown in FIG. 13. Fore portion 56 has a longitudinal axis B' disposed at an angle φ of between about 115° to about 125° with respect to the longitudinal axis A' of the rear portion 52. Thus, when fore portion 56 is inserted into the second handle section 48 of handle portion 34 of scoop subassembly 28 in the manner shown in FIG. 5, the second handle portion 48, which functions as a handgrip member adapted to be grasped by a user as shown in FIG. 13, becomes disposed at angle φ with respect to both the longitudinal axis A' of the rigid frame member rear portion 52 and the longitudinal axis A of the forearm of a user (again see FIG. 13).

In extensive research and development culminating in the present invention, it was discovered that disposing a handgrip member of a scoop, e.g., second handle section 48, at an angle of between about 115° to about 125° with respect to the longitudinal axis A of a user's forearm imposes a mild ulnar deviation on the user's wrist and hand which enables a user to effectively yet comfortably perform the essential forward thrusting and vertical lifting motions required associated with a scooping operation. Indeed, optimum performance is observed when this angle is about 118°.

More particularly, thrustability is enhanced by virtue of the minor ulnar deviation which is imposed on the user's wrist and hand. It has been discovered that ulnar deviation of this degree is comfortable to the typical user and increases the user's mechanical advantage in forward thrusting motions. Moreover, thrust delivery and reaction forces are transferred to the fleshly portion of the heel of the hand, which is significantly better adapted to deliver thrusting force and absorb thrust reaction force than the thumb and forefinger and their connecting tissue as is the case with existing scoop designs. Further, the hand and wrist are constrained in a comfortable orientation during vertical lifting, unlike prior scoop designs where wrist flexion and ulnar deviation are unrestrained. This coupled with most of the vertical lifting force being transferred from the hand and wrist to the user's forearm via the scoop support subassembly 30 allows a user to repeatedly lift a loaded scoop with minimal or no discomfort. Hence, continual wrist flexing and twisting, which with the passage of time promotes cumulative trauma injury, is effectively eliminated.

Although neither illustrated nor described in detail, alternative constructions and implementations of the scoop assembly 26 and/or its component parts that are consistent with the objectives of the present invention are also contemplated. For example, the cooperating connection between the scoop subassembly 28 and the scoop support subassembly 30 may be such that the handle portion of the scoop assembly is inserted into or otherwise joined with the fore portion 56 of the rigid frame member 50. However, for simplicity of design, as well as ease and cost of manufacture, the above-described connection between the scoop and scoop support subassemblies is presently preferred. Also, the scoop subassembly 28 may be used by itself, i.e., independently of the scoop support subassembly 30. If so employed, certain benefits in scoop thrustability and liftability will be realized although they would be considerably less than if the scoop subassembly is used in conjunction with the scoop support subassembly. Conversely, the scoop support subassembly 30 may be used with appropriately modified hand operated tools other than scoop assembly 28 where thrusting and/or vertical lifting motions are required. In addition, the scoop assembly 26 may be constructed as an integral unit whereby the scoop subassembly 28 and scoop support subassembly 30 are fixedly attached to one another. The releasable connection between subassemblies 28 and 30 disclosed hereinabove is preferred, however, in order to permit a user rapidly exchange scoop assemblies having bowl portions of different capacities when such is desired or necessary.

Consequently, although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A manually operated scoop assembly comprising:
   a scoop subassembly comprising a bowl portion and a handle portion rearwardly from said bowl portion, wherein said bowl portion is upwardly open and comprises a base defining a leading edge, side walls contiguous with said base and a substantially vertical rear wall connected to said base and side walls, wherein said handle portion projects downwardly and rearwardly from said rear wall to define a handle angle of between 30° to about 60° with respect to said rear wall;
   a scoop support subassembly for connecting said scoop subassembly to a user's forearm; and
   means for attaching said handle portion to said scoop support subassembly such that said handle portion and longitudinal axis of a user's forearm define an angle φ between about 115° to about 125° when said scoop assembly is connected to a user's forearm.

2. The assembly of claim 1 wherein said angle φ is about 118°.

3. The assembly of claim 1 wherein said attaching means comprise means for releasably attaching said handle portion to said scoop support subassembly.

4. The scoop assembly of claim 1 wherein said handle angle is about 45°.

5. The scoop assembly of claim 1 wherein said scoop support subassembly comprises a rigid frame member, a saddle member connected to said rigid frame member and adapted to contact the ventral side of a user's forearm, and means for releasably securing said scoop support subassembly to a user's forearm.

6. The scoop assembly of claim 5 further comprising means for adjustably securing said saddle member with respect to said rigid frame member.

7. The scoop assembly of claim 5 wherein said means for releasably securing comprise at least one strap attached to said saddle member and adapted to releasably fasten said saddle member into abutting contact with the ventral side of a user's forearm.

8. The scoop assembly of claim 5 wherein said rigid frame member comprises a rear portion having a first longitudinal axis extending substantially parallel to the longitudinal axis of a user's forearm when said scoop support subassembly is secured to a user's forearm, wherein said rigid frame member further comprises a fore portion having a second longitudinal axis extending at said angle φ from said first longitudinal axis, and wherein said attaching means comprises means for attaching said handle portion to said fore portion.

9. The scoop assembly of claim 8 wherein said attaching means comprises means provided in said handle portion for releasably receiving said fore portion.

10. The scoop assembly of claim 9 wherein said means for releasably receiving comprise a socket dimensioned to substantially matingly receive said fore portion.

11. The scoop assembly of claim 10 wherein said fore portion and said socket are substantially square in cross-section.

12. An implement support apparatus for use with a manually operated implement whose operative motions comprise thrusting and lifting, said apparatus comprising:

a rigid frame member, which comprises a rear portion having a first longitudinal axis extending substantially parallel to the longitudinal axis of a user's forearm when said support axis is secured to a user's forearm, wherein said rigid frame member further comprises a fore portion having a second longitudinal axis extending at an angle φ from said first longitudinal axis, a saddle member connected to said rigid frame member and adapted to contact the ventral side of a user's forearm;

means for releasably securing said implement support apparatus to a user's forearm;

means for attaching a handle of an implement to said fore portion of said rigid frame member such that the implement handle and the longitudinal axis of a user's forearm defines said angle φ of between about 115° to about 125° when the implement handle is attached to said rigid frame member and said implement support apparatus is secured to a user's forearm.

13. The implement support apparatus of claim 12 further comprising means for adjustably securing said saddle member with respect to said rigid frame member.

14. The implement support apparatus of claim 12 wherein said means for releasably securing comprise at least one strap attached to said saddle member and adapted to releasably fasten said saddle member into abutting contact with the ventral side of a user's forearm.

* * * * *